Aug. 12, 1969  H. N. GREENLEE, JR  3,460,838

DEVICE FOR REPRODUCING SOUND

Filed July 17, 1967

INVENTOR.
Howard N. Greenlee, Jr.
BY Parker & Carter
Attorneys.

United States Patent Office 3,460,838
Patented Aug. 12, 1969

3,460,838
DEVICE FOR REPRODUCING SOUND
Howard N. Greenlee, Jr., 2001 McDowell Road,
Vincennes, Ind. 47591
Filed July 17, 1967, Ser. No. 653,819
Int. Cl. G11b 1/04
U.S. Cl. 274—1     7 Claims

ABSTRACT OF THE DISCLOSURE

A device for reproducing audible sounds including a sound source mounted within the device and a swingable top pivotally attached to the device. The swingable top includes a sound pick up adapted to engage the sound source for generating auditory impressions when moved across the sound source.

---

This invention relates to a device for reproducing sound and, more particularly, to a talking block or similar device for reproducing audible sounds such as letters, words or similar auditory impressions.

Accordingly, a primary object of this invention is an improved device which is adapted to reproduce sufficiently audible sounds when actuated by a quick, simple manipulation.

A further object is a talking block having a hinged top surface whose free end traverses sound grooves thereby reproducing distinct, resonant sounds.

Another object is an educational toy consisting of a plurality of talking blocks which may be assembled and actuated to reproduce a continuous thought or message.

Another object is an educational toy for children which includes a number of talking blocks each having a letter or word thereon, and further each block is adapted to be actuated to sound out letters or words so that the child may compose various simple messages.

Other objects and advantages will be apparent from the ensuing specifications and drawings in which.

Figure 1:
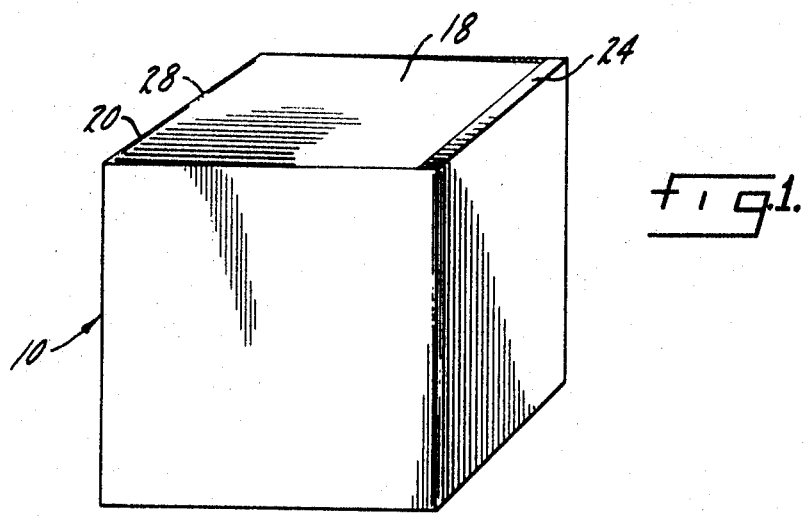
FIGURE 1 is a perspective view of the device for reproducing sound.

Referring more particularly to the drawings in which like numerals refer to like parts, it will be seen that this invention consists basically of a device 10 having a sound source means 12 with a top pivotal or swingable sound pick up means 14 adapted to engage sound grooves or ridges 16 within the device thereby reproducing audible sounds or speech.

The device 10 is shown in the figures in its preferred form with six flat surfaces of substantially the same size forming a cube shaped block. However, the device need not be cube shaped and may take other various forms or shapes.

The top surface 18 is pivotal about one edge 20 with the opposite free edge having a bevel 22 adapted to contact the sound grooves or ridges 16 within the cube shaped block. As shown, a lip 24 on the top edge prevents the top surface 18 from rising above the top of the block when it returns from being depressed.

Figure 3:
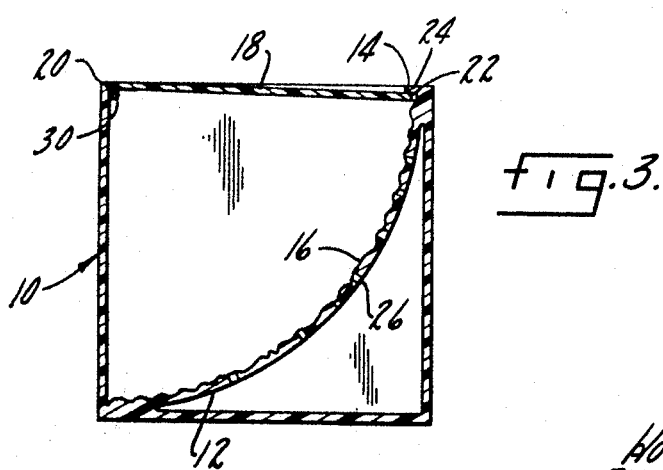
FIGURE 3 is a front sectional view of another form of this invention.

The device is preferably substantially hollow allowing the top surface 18 to be depressed into the block. As shown in FIGURE 3, the space under the sound grooves 16 may also be hollow with holes or openings 26 to act as a sounding board. In addition, the top surface 18 acts as a sounding board giving distinctness and sonority to sounds reproduced by the talking block.

A sound source means or sound carrier 12 is mounted within the block, and is shown in the figures as sound grooves or ridges 16. The sound grooves are adapted to be engaged by the sound pick up means 14 which is shown having a free beveled edge 22.

Figure 2:
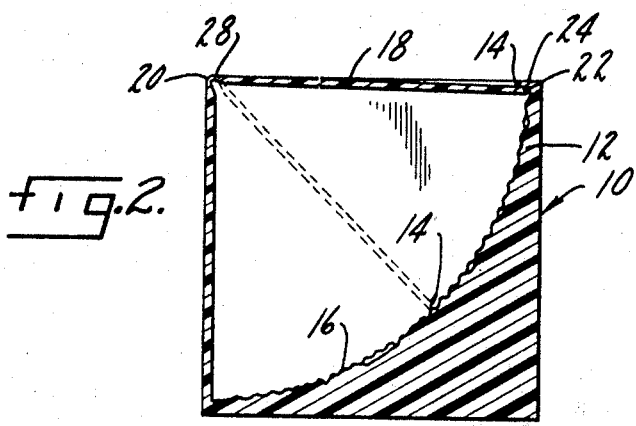
FIGURE 2 is a front sectional view of the device.

The device is preferably made from plastic, and may be formed in a single molding operation. In FIGURES 1 and 2 the swingable top surface 18 is shown having a live hinge 28 which allows the block to be constructed from a single sheet of plastic. The live hinge 28 simply means that the characteristics of the material allow it to act like a hinge. In other words the plastic material at the joint of the top surface 18 is flexible and permits free rotating of the top without the use of a separate hinge and hinge attachment.

Figure 4:
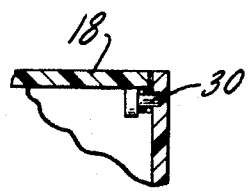
FIGURE 4 is an enlarged partial sectional view showing the hinging arrangement in FIGURE 3.

If desired the top surface 18 may have a spring hinge 30 also allowing free pivotal movement of the top. This embodiment is shown in FIGURES 3 and 4.

The device will often be used in plurality with the user assembling a number of blocks in various orders to form simple sentences or messages. To facilitate use of the blocks each block may have a word such as "table," "girl," or "cat" on its exposed surface. The block may also include a picture corresponding with the word on the block thus giving the user both a visual and auditory impression of the word. Further, if desired, each block may be color coded with, for instance, nouns colored red, verbs colored blue, and adjectives colored yellow and adverbs colored green.

The use, operation and function of this invention are as follows:

Assume the invention is employed as an educational toy for use by children who are learning the basics of sentence formation and reading. To form a sentence the child merely selects the appropriate word or message which appears on the exposed surface of the block. Next, the child pushes down on the top surface 18 of the block and the sound pick up means 14 engages the sound grooves 16 in the block thereby sounding out a word like "table," "girl," or "cat." Preferably, the beveled edge 22 of the sound pick up means 14 and the sound grooves 16 have a tooth and ratchet type relationship so that no obstacle is presented during the return movement of the top surface 18. The lip 24 prevents the top surface from rising above the top when returning from its downward movement.

In addition, it should be noted that the hinged top is preferably constructed so that the sound pick up means 14 only contacts the sound source means 12 on either its downward or return trip. In other words, the swingable top surface 18 is preferably substantially rigid when subjected to rotational pressure in one direction, and slightly flexible when subjected to rotational pressure in the opposite direction. This will allow the sound pick up means 14 to only contact the sound grooves 16 on either its downward or return trip thereby eliminating a distorted message when backing over the sound grooves.

I claim:
1. A device for reproducing audible sounds including:
   a housing in the shape of a substantially hollow block,
   a sound source means mounted within the housing, said sound source means having a plurality of openings therethrough to give distinctness and sonority to the audible sounds generated by the device,
   an integral top pivotally attached to the housing and having a free edge adapted for swinging movement, and
   a sound pick up means mounted on the free edge of the top for engaging the sound source means to generate audible sounds when moved across the sound source means.

2. The structure of claim 1 further characterized in that the sound source means is a sound carrier consisting of a plurality of sound grooves.

3. The structure of calim 1 further characterized in that the free edge of the top is beveled for engaging the sound source means.

4. The structure of claim 1 further characterized in that the top is substantially rigid when subjected to rotational pressure in one direction and slightly flexible when subjected to rotational pressure in the opposite direction.

5. The structure of claim 1 further characterized in that the device is made from a single sheet of plastic.

6. The structure of claim 1 further characterized by a spring hinge mounted along an edge of the top allowing free pivotal movement of said top.

7. The structure of claim 1 further characterized in that the housing has a lip for preventing the swingable top from rising above the horizontal plane of the device.

References Cited

UNITED STATES PATENTS 2,547,603    4/1951    Segal et al. _____ 74—483

LEONARD FORMAN, Primary Examiner

F. J. D. AMBROSIO, Assistant Examiner

U.S. Cl. X.R.

46—175